United States Patent [19]

Schöggl

[11] Patent Number: 5,305,220
[45] Date of Patent: Apr. 19, 1994

[54] APPARATUS FOR ELECTRONICALLY MEASURING THE SPEED OF INTERNAL COMBUSTION ENGINES AND METHOD OF OPERATING SUCH APPARATUS IN MONITORING AN INTERNAL COMBUSTION ENGINE

[76] Inventor: Peter Schöggl, Eggenbergergürtel 13, A-8020 Graz, Austria

[21] Appl. No.: 702,073

[22] Filed: May 17, 1991

[30] Foreign Application Priority Data

May 23, 1990 [AT] Austria .................. A 1139/90

[51] Int. Cl.⁵ .................. F02P 5/06; G06F 15/48
[52] U.S. Cl. .................. 364/431.03; 123/418; 123/339; 364/431.07
[58] Field of Search .................. 364/431.03, 431.05, 364/431.06, 431.11, 431.12; 73/116; 123/418, 425, 339, 571, 119

[56] References Cited

U.S. PATENT DOCUMENTS

| | | | |
|---|---|---|---|
| 3,690,306 | 9/1972 | Matsui et al. | 123/119 |
| 3,969,614 | 7/1976 | Moyer et al. | 235/150.21 |
| 4,274,385 | 6/1981 | Yuzawa et al. | 123/571 |
| 4,301,678 | 11/1981 | Full et al. | 73/116 |
| 4,367,530 | 1/1983 | Morinaga et al. | 364/431.06 |
| 4,649,881 | 3/1987 | Long | 123/418 |
| 4,697,561 | 10/1987 | Citron | 123/339 |

FOREIGN PATENT DOCUMENTS 3421640 1/1985 Fed. Rep. of Germany .
2198241 6/1988 United Kingdom .

Primary Examiner—Thomas G. Black
Assistant Examiner—Jacques H. Louis-Jacques
Attorney, Agent, or Firm—Collard & Roe

[57] ABSTRACT

An apparatus and process for electronically measuring rotational characteristics of a rotating part that rotates with a crankshaft of an internal combustion engine. The rotating part has reference marks and measuring scale marks thereon. The apparatus includes a first pick up for detecting the passage of reference marks and a second pick up for detecting the passage of measuring scale marks. A counter connected to the second pick up counts the detected measuring scale marks. A timer controls the stage of the counter. A load sensor detects the load on the engine. A computer is connected to the first pick up, the counter, the timer, and the load sensor. The computer calculates the instantaneous rotational speed of the rotating part by differentiating the counts obtained during instantaneous counter stages. The computer includes decision logic with a predetermined threshold value. When the engine load is less than the predetermined threshold value, the computer measures the speed during at least several rotations of the rotating part. When the engine load is greater than the predetermined value or when the engine load is changing, the computer measures the number of rotations, the rotational speed or the change in rotational speed during a partial rotation of the rotating part.

2 Claims, 2 Drawing Sheets

APPARATUS FOR ELECTRONICALLY MEASURING THE SPEED OF INTERNAL COMBUSTION ENGINES AND METHOD OF OPERATING SUCH APPARATUS IN MONITORING AN INTERNAL COMBUSTION ENGINE

BACKGROUND OF THE INVENTION

1. Field of the Invention

This invention relates to an apparatus for an electronic measurement of the speed of internal combustion engines, comprising a computer, which serves to compute the speed and is connected to receiving means for detecting the passage of reference marks and of measuring scale graduations on a member which revolves with the crankshaft, and to a timer. This invention relates also to a method of operating such apparatus in monitoring an internal combustion engine.

2. Description of the Prior Art

Apparatuses of that kind are mainly used in combination with electronic control systems for metering the fuel, for determining the ignition timing and for performing other control measures for controlling the engine. The most important information for such control systems is the information on the instantaneous speed of the motor. In that connection the term "speed" may also be used to describe the angular or circumferential velocity during each revolution of the engine. Particularly in internal combustion engines having small flywheels, particularly in engines having a small volume and a small number of cylinders, that circumferential velocity varies relatively strongly as a result of the expansion of the combustion gases after the ignition and the compaction of the combustion gases before the ignition and the largest fluctuations occur when the speed is low and the load on the engine is high. Speed fluctuations over a plurality of revolutions may occur when the combustion is irregular or when the ignition and the fuel injection have intentionally been omitted during single revolutions. By means of the known apparatuses of the kind described first hereinbefore said fluctuations cannot be determined with sufficient accuracy so that the desired real-time control is adversely affected.

In known apparatuses of the kind described first hereinbefore the time of a revolution or the circumferential velocity of the crankshaft is detected for the speed measurement. In the first variant, a counter counting at a constant rate is basically provided and is controlled or read under the control of the reference marks provided on a rotating member so that the counter detects the repetition time of the reference marks. For the determination of the circumferential velocity, graduations which constitute a measuring scale are provided on the periphery of a member which rotates in unison with the crankshaft, e.g., on a very simple timing disk, and a timer is used to determine a gating time during which the graduations of the measuring scale moving past the receiver are counted. That count is proportional to the average circumferential velocity or angular velocity of the crankshaft but will not reflect the above-mentioned speed fluctuations over a plurality of revolutions so that such fluctuations cannot be evaluated.

Whereas it is known from DE-A-34 21 640 to store the measured values obtained during each revolution and to compare them with the measured values obtained during the next following revolution so that speed changes can thus be detected, the speed change is detected in that case only after it has taken place so that a control action cannot be taken in time.

From GB-B-2,198,241 it is known that inaccuracies in the pitch of graduations of a control disk or teeth of a control gear can be compensated in that correcting tables for the several graduations or teeth are stored in a computer, by which each measured-value signal generated during the passage of a mark or tooth is modified by a corresponding correcting signal so that the measurements will be taken in dependence on the corrected signals and will correspond to the measurements which would be obtained if the control disk or control gear had exactly the correct pitch. When the disks or gears are manufactured in series it will be assumed that the correcting values will also be the same so that the computer can be provided with fixedly programmed correcting tables.

SUMMARY OF THE INVENTION

It is a first object of the invention to provide an apparatus which is of the kind described first hereinbefore and which is intended to detect changes of the speed also within one revolution and particularly at those points of a revolution which are critical for the control so that a more exact control of the internal combustion engine by means of electronic control means can be effected also in dependence on the operating conditions of the internal combustion engine.

It is a second object of the invention to provide a method of monitoring the operation of an internal combustion engine by means of such an apparatus, which is operated in an improved manner.

The first object is accomplished in accordance with the invention in that separate receivers are provided for detecting the passage of the reference marks and of the measuring scale graduations, respectively, the receiver which is responsive to the measuring scale graduations controls a counter, the counts of which are adapted to be read by the computer several times during each revolution under the control of the timer and of the receiver which is responsive to the reference marks, the computer computes the instantaneous angular velocity from instantaneous counts of the counter by subtracting operations, a load sensor for detecting the instantaneous load on the motor is connected to the computer, a rate of load change detector is operatively connected to said load sensor and is operable to detect the rate of change of said engine load in dependence on said instantaneous loads on said engine, a decision logic defining first and second predeterminable threshold values is incorporated in said computer, and the computer is operable under the control of said decision logic so that in case of an engine load in excess of said first threshold value or a rate of change in excess of said second threshold value said computer is operable to compute the speed or angular velocity of said member or the rate of change of said speed or angular velocity from a small number of said counts read during one revolution or during less than one revolution of said member and when said engine load is less than said first threshold value and said rate of load change is less than said second threshold value said computer is operable to compute the speed of said member from said counts read during a plurality of revolutions of said member.

The second object is accomplished in accordance with the invention in that a plurality of angular velocity values derived from predetermined angular movements are computed from said counts read during each revolution and said computed values are arithmetically combined for a computation of the rate of change of the angular velocity within one or more revolutions as determined by the decision logic.

Measurements are taken which are proportional to the instantaneous velocity. An additional control by the receiver for detecting the reference marks may be adopted to determine the range, i.e., the angular range from the ignition point, in which the velocity measurements are taken. Only a simple arithmetic unit is required for this purpose and may be constituted even by a module which is merely computerlike because substantially only subtracting operations will be required. The decision logic will have the effect that the speed will be determined from only one or a few individual measurements taken during one revolution in the region of relatively rapid speed fluctuations, particularly during an operation of the engine under its full load, because under such operating conditions the load-dependent changes of the circumferential velocity will exceed the changes which are due to a non-uniformity caused by the ignition and compression. On the other hand, during a continuous operation under an approximately constant average load the last-mentioned speed fluctuations over a plurality of revolutions can be detected and taken into account. Besides, by the use of the decision logic the measure adopted in accordance with the invention will eliminate an overcontrol of the engine, which overcontrol might cause the control system to hunt. Moreover, the decision logic may be controlled by signals which are directly derived from the measured speed values if it is ensured that the short-time detection will be adopted when the difference between the last two measured values exceeds a certain value.

DETAILED DESCRIPTION OF THE PREFERRED EMBODIMENT

Figure 1:
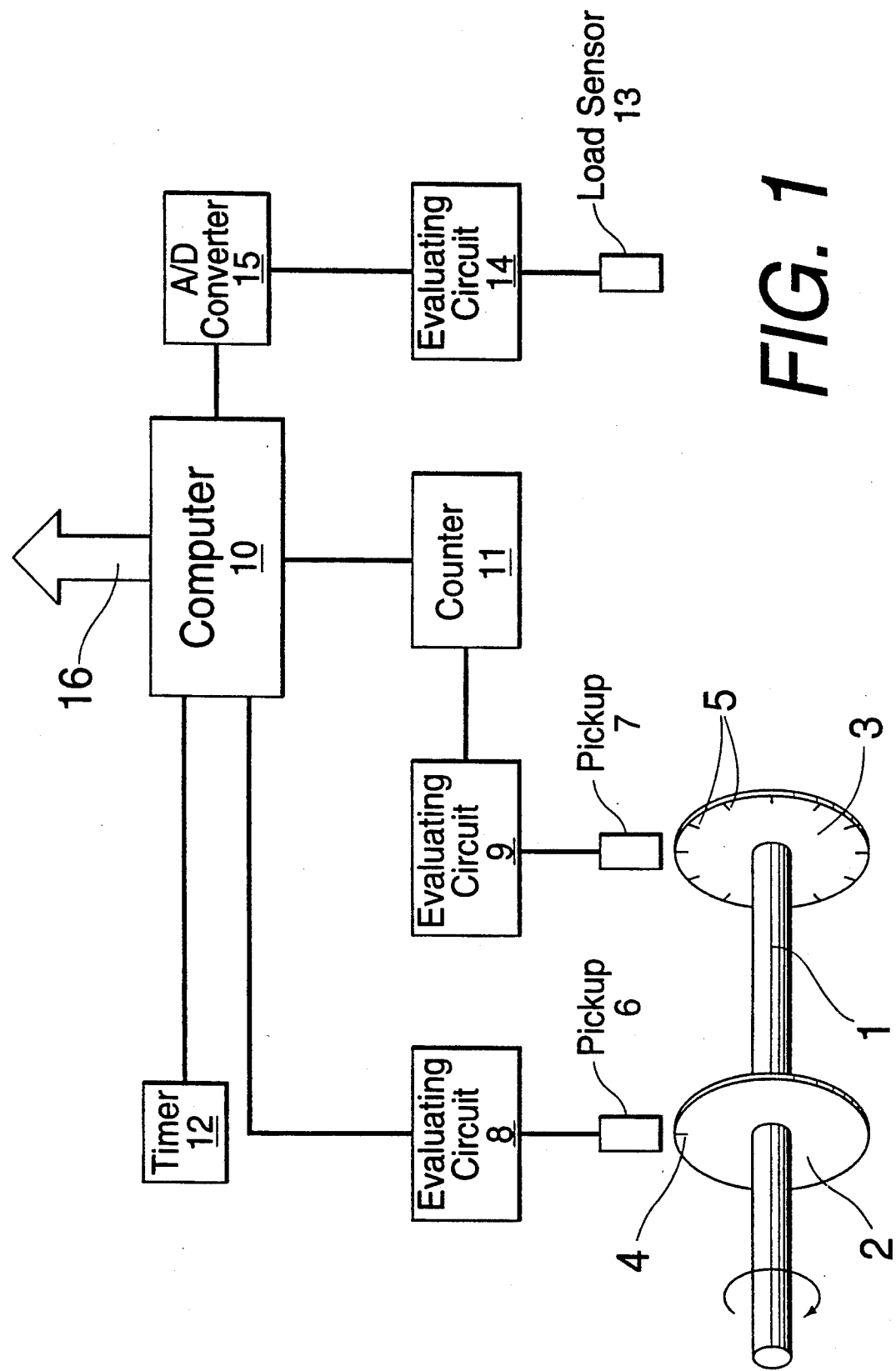
FIG. 1 is a block circuit diagram of an apparatus in accordance with the invention and FIG. 2 is a circular graph in which the reading times and the other characteristics have been entered for one revolution of the engine.

In the illustrative embodiment two measuring disks 2, 3 are mounted on the crankshaft of an internal combustion engine or on a shaft 1 which rotates in unison with the crankshaft or on a separate shaft, which is driven by the crankshaft. One of said measuring disks carries at least one reference mark 4. The second disk 3 carries graduations which constitute a measuring scale 5. The reference marks 4 and the measuring scale 5 are adapted to be scanned, preferably in a non-contacting manner, by respective pickups 6 and 7. The scanning may be effected in known manner by optoelectronic, magnetic, inductive, capacitive or electrostatic scanning methods. In response to the passage of a mark 4 or of an individual increment of the measuring scale 5 the associated pickup 6 or 7 generates an electric signal. The reference mark 4 may generate in the pickup 6 a passage-indicating signal when a piston of the internal combustion engine is at its top dead center. Corresponding marks for the dead center positions of all pistons may be provided.

The pickups 6, 7 are connected to evaluating circuits 8, 9, by which the sample signals, particularly if they are obtained as analog signals, are processed to provide digital signals which can be processed in a computer 10 and/or counter 11. By the evaluating circuit 8 the pickup 6 is directly connected to a computer 10. By means of the evaluating circuit 9 the pickup 7 controls a digital counter 11, which is connected to computer 10.

A timer unit 12 and a load sensor 13 are also connected to the computer. An evaluating circuit 14 and an analog-to-digital converter 15 are associated with the load sensor 13. The load sensor 13 may detect the instantaneous load on the engine, e.g. in dependence on the position of a throttle valve of the engine or the air flow rate in the intake pipe. The evaluating circuit 14 may be used to differentiate the measured-value signals coming from the load sensor 13 so that signals corresponding to the rate of load change are delivered to the computer 10 via the analog-to-digital converter 15. The timer 12 may consist of a free-running timer and may include divider stages for determining or preselecting a certain cycle time.

Figure 2:
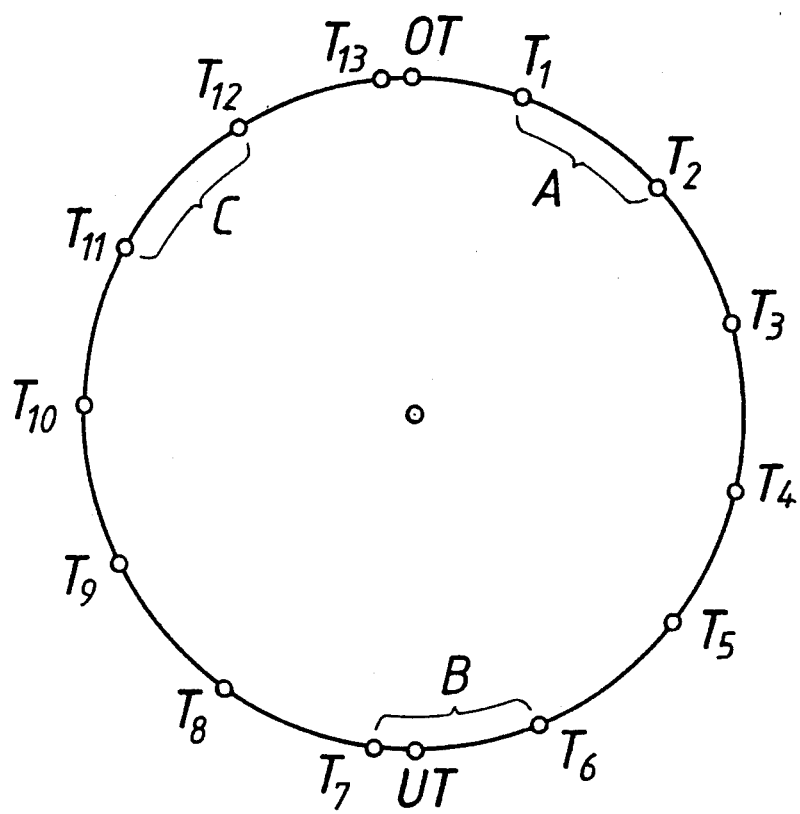

A method which may be adopted to evaluate the detected signals will be described with reference to FIG. 2. During a revolution of the crankshaft the pickup 6 will upon the passage of the mark 4 deliver to the computer 10 a signal which indicates the arrival at the top dead center OT or the ignition time. During the revolution of the shaft 1 the measuring scale 5 will be scanned by the pickup 7 for a continual generation of measured-value signals, which are counted by counter 11. The computer is controlled by the timer 12 and owing to its control program will determine measuring periods A, B, C. In the graph of FIG. 2, the top and bottom dead centers OT, UT and the time signals $T_1$, $T_2$, ... which are received from the free-running timer 12 during a revolution of the crankshaft. The computer 10 may so be programmed that it will read the count of the counter 11 only at the beginning and end of the measuring periods, and may, e.g., be programmed to read and store the count in response to the first timing signal $T_1$ which arrives after OT, to read the count once more at the end of the measuring period A, at the time $T_2$, to subtract the previously stored count from the value which has now been detected and to store the resulting difference, which is proportional to the circumferential velocity in the subrange A. Additional corresponding partial measurements may be taken in the measuring periods B and C. Because the computer 10 receives the time signals from timer 12 as well as the position signals via 4 and 6 so that the velocity measurements can be taken in approximately equal angular regions of the crankshaft even when speed changes occur and result in a change of the number of measuring times $T_1$ etc. during a revolution. The partial measured values for the periods A, B and C are stored and processed further in the computer. A decision logic is provided. In dependence on the load on the engine, which is detected via 13, or the rate of change of the load on the engine (via 14), and optionally in dependence on additional criteria, e.g., in dependence on the basic speed, which can easily be determined by a counting of passages of 4 (=OT) at 6, or in dependence on the measured and computed speed, that decision logic determines whether the signal which is delivered by the computer via an output 16 to the engine control system and/or to measuring and indicating means will be derived from the measured values obtained during one revolution or as the average of the measured values obtained during a plurality of revolutions.

Various variants may be adopted within the scope of the invention. In one of said options, divider stages of the timer 12 may be used to change the predetermined cycle time in dependence on the speed. That change of the cycle time will obviously be taken into account in the computation. Besides, the signals from the pickup 6 may suitably be transformed and may then be used to start and/or reset the counter 11. Finally, the marks 4 and the measuring scale 5 may be provided on a common carrier, which is scanned in two tracks by the pickups 6 and 7.

I claim:

1. An apparatus for electronically measuring rotational characteristics of a rotating part that rotates with a crankshaft of an internal combustion engine, the rotating part having reference marks and measuring scale marks thereon, the apparatus comprises:
    a first pick up for detecting the passage of the reference mark as the rotating part rotates;
    a second pick up for detecting the passage of the measuring scale marks as the rotating part rotates;
    a counter connected to said second pick up for counting the detected measuring scale marks;
    a timer for controlling the stage of said counter;
    a load sensor for detecting the load on the engine;
    a computer connected to said first pick up, said counter, said timer, and said load sensor, wherein said computer calculates the instantaneous rotational speed of the rotating part by differentiating the counts obtained by said timer during instantaneous counter stages, said computer including decision logic with a predetermined threshold value;
    said computer measuring the speed of the rotating part during a counter stage that lasts at least several rotations of said rotating part when said computer detects an engine load below said predetermined threshold value; and
    said computer selectively measuring the number of rotations, the rotational speed, and the change in rotational speed of said rotating part during predetermined angles of rotation of the rotating part during counter stages lasting less than one revolution of the rotating part when said computer detects one of an engine load greater than said predetermined threshold value and a changing engine load.

2. A process for electronically measuring rotational characteristics of a rotating part that rotates with a crankshaft of an internal combustion engine, the rotating part having reference marks and measuring scale marks thereon, the process comprising the steps of:
    detecting the passage of reference marks with a first pick up as the rotating part rotates;
    detecting the passage of measuring scale marks with a second pick up as the rotating part rotates;
    counting the measuring scale mark detected by the second pick up with a counter;
    controlling the stage of the counter with a timer;
    detecting the load on the engine with a load sensor;
    calculating the instantaneous rotational speed of the rotating part by differentiating the counts obtained during instantaneous counter stages;
    measuring the speed during a counter stage that lasts at least several rotations when the engine load is less than a predetermined threshold value;
    selectively measuring the number of rotations, the rotational speed and change in rotational speed during predetermined angles of rotation of the rotating part during counter stages lasting less than one revolution when the engine load is one of (i) greater than the predetermined threshold value and (ii) changing; and
    combining the rotational speed values obtained during predetermined angles of rotation to compute the change in the rotational speed within one rotation as determined by the decision logic.

* * * * *